United States Patent [19]

Chang et al.

[11] Patent Number: 4,467,081

[45] Date of Patent: Aug. 21, 1984

[54] GELABLE, SILICATE RICH RESINS FROM HYDROPHOBIC POLYOLS AND VOLATILE AND/OR INCOMPATIBLE ORGANOSILICATES

[75] Inventors: Wen-Hsuan Chang; David T. McKeough, both of Gibsonia; John R. Peffer, Pittsburgh, all of Pa.

[73] Assignee: PPG Industries, Inc., Pittsburgh, Pa.

[21] Appl. No.: 462,572

[22] Filed: Jan. 31, 1983

[51] Int. Cl.$^3$ ............................................. C08G 77/04
[52] U.S. Cl. ........................................ 528/26; 528/28;
 528/29; 528/34; 524/100; 524/783; 524/859;
 556/437; 556/438; 556/413; 556/414; 556/418;
 556/462; 556/450
[58] Field of Search .................... 528/26, 28, 29, 34;
 524/100, 783, 859; 556/437, 438, 413, 414, 418,
 462, 450

[56] References Cited

U.S. PATENT DOCUMENTS

| | | | |
|---|---|---|---|
| 2,048,799 | 7/1936 | Lawson | 260/96 |
| 2,615,861 | 10/1952 | Peyrot et al. | 528/34 |
| 2,630,446 | 3/1953 | Gresham | 260/448.8 |
| 2,821,517 | 1/1958 | Sattler et al. | 528/29 |
| 2,877,202 | 3/1959 | Olson | 260/45.4 |
| 2,885,384 | 5/1959 | Sterman | 528/29 |
| 2,911,386 | 11/1959 | Olson et al. | 260/46.5 |
| 2,917,467 | 12/1959 | Olson et al. | 260/2 |
| 3,150,116 | 9/1964 | Masters | 260/47 |
| 3,154,597 | 10/1964 | McWhorter | 260/824 |
| 3,388,101 | 6/1968 | Wismer et al. | 528/28 |
| 3,429,851 | 2/1969 | Coates et al. | 260/46.5 |
| 3,539,658 | 11/1970 | Sekmakas et al. | 260/827 |
| 3,624,014 | 11/1971 | Moore et al. | 260/18 S |
| 3,917,648 | 11/1975 | McLeod | 260/32.8 SB |
| 3,932,339 | 1/1976 | McLeod | 260/32.8 SB |
| 3,997,501 | 12/1976 | McLeod | 260/37 SB |
| 4,013,698 | 3/1977 | Lohse et al. | 260/448.8 R |
| 4,069,178 | 1/1978 | Mikami et al. | 260/22 S |
| 4,093,673 | 6/1978 | Chang et al. | 260/824 EP |
| 4,113,665 | 9/1978 | Law et al. | 524/783 |
| 4,243,767 | 1/1981 | Kaufman et al. | 525/102 |
| 4,302,571 | 11/1981 | Arai et al. | 528/32 |

Primary Examiner—Melvyn I. Marquis
Attorney, Agent, or Firm—Thomas M. Breininger

[57] ABSTRACT

Disclosed is a resin comprising a reaction product prepared by partially reacting to homogeneity a hydrophobic polyol and an organosilicon-containing material comprising an organosilicon-containing substance. The organosilicon-containing substance has atoms bonded directly to silicon, all of which atoms are selected from oxygen, nitrogen, and/or chlorine, and additionally has moieties directly bonded to silicon which are easily displaceable by reaction with water and/or alcohol. At least a part of the organosilicon-containing substance is hydrolyzed. The reaction product is homogeneous and contains residual hydroxyl moieties from the hydrophobic polyol and residual moieties bonded directly to silicon which are easily displaceable. the reaction product is capable of self-curing, optionally with a catalyst, by reaction with moisture and/or with the residual hydroxyl moieties, of the residual moieties directly bonded to silicon which are easily displaceable.

19 Claims, No Drawings

4,467,081

GELABLE, SILICATE RICH RESINS FROM HYDROPHOBIC POLYOLS AND VOLATILE AND/OR INCOMPATIBLE ORGANOSILICATES

BACKGROUND OF THE INVENTION

Given the increasing costs and scarcity of petroleum based energy sources and concern over the possible harmful effects of high concentrations of various volatile organic solvents in the environment, there has arisen a need in the coatings industry for coating compositions which contain ever lower concentrations of volatile organic components and which are based to an ever decreasing degree on expensive petroleum based components.

However, previous approaches to meet both of the above challenges, generally have involved compromises among desirable coating composition properties such as molecular weight of the principal film forming resin, application viscosity of the composition, low curing temperature, and desirable properties of the cured film such as water resistance, flexibility, hardness, solvent resistance, etc.

It would be desirable to produce coating materials which contain low levels of organic solvents, cure at low temperatures, have low application viscosities, do not generate highly toxic volatile materials upon curing, contain less petroleum based components, and yet cure to produce films having desirable features at least as good as conventional, cured films.

SUMMARY OF THE PRESENT INVENTION

A resin of the present invention comprises a reaction product prepared by at least partially reacting to homogeneity a hydrophobic polyol and an organosilicon-containing material comprising an organosilicon-containing substance having atoms bonded directly to Si all atoms of which are selected from the group consisting of oxygen, nitrogen and/or chlorine. The organosilicon-containing substance also has moieties directly bonded to Si which are easily displaceable by reaction with water and/or alcohol. At least a part of the organosilicon-containing substance is hydrolyzed. Generally, such hydrolyzed organosilicon-containing substances will be at least partially condensed to a compound or mixture of compounds containing at least one siloxane linkage per molecule and containing a residual amount of the moieties directly bonded to silicon which are easily displaceable by reaction with water and/or alcohol.

The reaction product of the organosilicon-containing material and hydrophobic polyol is homogeneous and contains residual hydroxyl moieties from the hydrophobic polyol and residual moieties from the organosilicon-containing material which are directly bonded to Si and are easily displaceable. The reaction product can be self-cured, typically in the presence of a catalyst, to a continuous film by reaction of the residual moieties which are easily displaceable with moisture and/or with the residual hydroxyl moieties from the hydrophobic polyol.

DETAILED DESCRIPTION OF THE INVENTION

A liquid composition of the present invention comprises a reaction product prepared by partially reacting to homogeneity:

(A) at least one hydrophobic polyol essentially free of modification by fatty acid; and
(B) an organosilicon-containing material comprising
  (1) at least one organosilicon-containing substance free of functional groups attached directly to carbon and essentially free of alkali metal ions, having atoms bonded directly to Si, all of which atoms are selected from the group consisting of O, N, and/or Cl, the organosilicon-containing substance additionally having moieties directly bonded to Si which are easily displaceable by reaction with water and/or alcohol, wherein at least a part of the organosilicon-containing substance is hydrolyzed to a compound or a mixture of compounds containing a residual amount of the moieties directly bonded to silicon which are easily displaceable by reaction with water and/or alcohol;
  (2) optionally a nonfunctional organosilane, a hydrolyzed nonfunctional organosilane, or a mixture thereof;
  (3) optionally a functional organosilane, a hydrolyzed functional organosilane, or a mixture thereof; wherein prior to reaction, the hydrophobic polyol and organosilicon-containing material are incompatible and/or the organosilicon-containing material is highly volatile; and after the reaction, the reaction product is homogeneous and contains residual hydroxyl moieties from the hydrophobic polyol and residual moieties from the organosilicon-containing material which are directly bonded to silicon and are easily displaceable; and the reaction product is capable of self-curing to a continuous film by reaction, with moisture and/or with the residual hydroxyl moieties, of the residual moieties from the organosilicon-containing material which are bonded directly to Si and are easily displaceable.

The reaction product is homogeneous and capable of being gelled according to a specific three-step gel test discussed infra. Additionally, the reaction product preferably has a low volatility.

Polycarbinols (hereinafter referred to for convenience simply as polyols) suitable for preparing the resins of the present invention are hydrophobic polyols typically having a hydroxyl equivalent weight of from 45 to 1000, preferably of from 59 to 600. Typically the hydroxyl equivalent weight of polyols used to prepare resins of the invention suitable for high solids coating compositions ranges from 59 to 500, preferably from 70 to 300. Diols are preferred for the hydrophobic polyol component for forming resins of the invention. The polyols typically are free of ethylenic unsaturation, typically contain at least 4 carbon atoms, typically are essentially free of phenolic hydroxyl moieties, and typically are essentially free of multiple 1,2-epoxy moieties such as contained in hydroxyl functional diepoxides. Preferably, at least a part of the polyol contains nonvicinal hydroxyl groups, that is, hydroxyl groups which are bonded to carbon atoms which are separated from each other by at least 1 intervening carbon atom. A large amount of high molecular weight 1,2-glycols generally is undesirable in polyols used to prepare the resins of the invention since the high molecular weight 1,2-glycols are believed to contribute to the formation of a high yield of cyclic moieties in the resins prepared therefrom thereby decreasing the number of reactive functional groups in the resins and also lessening the cure response.

A large amount of low molecular weight 1,2-glycols, such as ethylene glycol and propylene glycol, also is undesirable since such glycols tend to volatilize during cure and therefore prevent the formation of a continuous water-resistant film if no hydrophobic polyol is present in the resin. Additionally, polyols containing hydroxyl moieties separated from each other by only three carbon atoms are also undesirable for similar reasons. However, an amount of such diol moieties insufficient to adversely affect the cure response and properties of the cured film can be employed in the resins of the invention and sometimes may even be desirable.

The term "hydrophobic polyol" is intended to mean a polyol having limited compatibility with water as determined by the following procedure. Thirty parts by weight of polyol and 70 parts by weight of water are thoroughly mixed together at 80° Celsius (°C.) for 5 minutes. Upon cooling to room temperature, if the polyol/water mixture separates into two phases, the polyol is considered herein to be a hydrophobic polyol useful for the preparation of resins of the invention. Polyols such as ethylene glycol when mixed with water according to the above procedure for determining hydrophobic polyols produce a homogeneous (i.e. single phase) mixture and are considered herein to be hydrophilic. Pure hydrophilic polyols are not desirable for preparation of the resins of the invention because the resultant reaction product will disadvantageously degrade either during curing or as a cured film either by evaporation or by hydrolysis to produce SiO$_2$. Thus, for example, such hydrophilic polyols often will not permit continuous films to be formed when resins prepared from such polyols are cured.

An advantage of using hydrophobic polyols in the preparation of the resins of the invention is that they enhance the hydrolytic stability of the oxygen to silicon bond (i.e.,

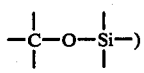

formed by the reaction of the hydroxyl moiety on the polyol with a reactive moiety on the organosilicon-containing material. Additionally, sterically hindering groups attached to carbon which is bonded through oxygen to silicon also are believed to contribute to hydrolytic stability of the oxygen to silicon bond. Hydrolytic stability of the aforementioned oxygen to silicon bond is believed to contribute to the resistance of cured coatings prepared from the resins of the invention to degradation by water either in the form of liquid water or water vapor. The organic portion of the resins of the invention surprisingly stays in cured films prepared from these resins. Additionally, cured coatings prepared from resins of the invention generally have excellent humidity resistance. It is also believed that the utilization of hydrophobic polyols enables the resins of the invention to function as durable, protective film formers per se. This is to be contrasted with silicate-containing resins based on low molecular weight, highly volatile, hydrophilic polyols, for example, ethylene glycol, for which the organic portion essentially leaves the film when the resin is thermally cured. Thus a polyol, such as ethylene glycol, which is hydrophilic, has 1,2-glycol groups, is highly volatile, and can be considered to be a leaving group, represents a polyol having a combination of very undesirable properties which makes the use of significant amounts of such polyol undesirable for making a resin of the present invention. A significant amount of ethylene glycol, for example, would represent more than 50 percent by weight of the polyol, component (A). However, less than 30 percent of a polyol such as ethylene glycol can be used in preparing a resin of the invention and may even be desirable to the extent that it represents a good leaving group on curing without contributing to undesirable properties in a resultant cured film prepared from a resin of the invention.

Examples of polyols useful in the preparation of resins of the present invention include the hydrophobic polyols in the broad classes including: simple diols, triols, and higher hydric alcohols; polyester polyols; polyether polyols; amide containing polyols; and polyurethane polyols.

The simple diols, triols, and higher hydric alcohols useful in the preparation of the resins of the invention are generally known, examples of which include: 1,2-butanediol, 1,4-butanediol; 1,3-butanediol, 2,2,4-trimethyl-1,3-pentanediol; 1,5-pentanediol; 2,4-pentanediol; 1,6-hexanediol; 2,5-hexanediol; 2-methyl-1,3-pentanediol; 2-methyl-2,4-pentanediol; 2,4-heptanediol; 2-ethyl-1,3-hexanediol; 2,2-dimethyl-1,3-propanediol; 1,4-cyclohexanediol; 1,4-cyclohexanedimethanol; 1,2-bis (hydroxymethyl) cyclohexane; 1,2-bis (hydroxyethyl) cyclohexane; 2,2-dimethyl-3-hydroxypropyl-2,2-dimethyl-3-hydroxypropionate; dipropylene glycol; the alkoxylation product of 1 mole of 2,2-bis (4-hydroxyphenyl) propane (i.e., bisphenol-A) and 2 moles of propylene oxide available as DOW-565 from Dow Chemical Company; and the like. Of the above simple diols, triols, and higher hydric alcohols, less desirable are dipropyleneglycol and 1,3 type diols such as 1,3-butanediol, 2,2,4-trimethyl-1,3-pentanediol, 2,4-pentanediol, 2-methyl-1,3-pentanediol, 2-methyl-2,4-pentanediol, 2,4-heptanediol, 2-ethyl-1,3-hexanediol, and 2,2-dimethyl-1,3-propanediol when employed as the sole polyol component because of the tendency of some of these diols to form cyclic moieties during reaction with the organosilicon-containing material and because some of these diols are on the boundaries of being hydrophilic as determined by the test for hydrophobicity described above.

Hydrophobic polyester polyols useful in the preparation of resins of the invention are generally known and are prepared by conventional techniques utilizing simple diols, triols and higher hydric alcohols known in the art including but not limited to the previously described simple diols, triols, and higher hydric alcohols (optionally in combination with monohydric alcohols) with polycarboxylic acids, optionally polycarboxylic acids essentially free of ethylenic unsaturation. As used herein, the phrase "polycarboxylic acids essentially free of ethylenic unsaturation" is intended to include acids containing aromatic unsaturation but essentially no ethylenic unsaturation. Examples of suitable polycarboxylic acids include: phthalic acid; isophthalic acid; terephthalic acid; trimellitic acid; tetrahydrophthalic acid, hexahydrophthalic acid; tetrachlorophthalic acid; adipic acid, azelaic acid, sebacic acid; succinic acid; malic acid; glutaric acid; malonic acid; pimelic acid; suberic acid; 2,2-dimethylsuccinic acid; 3,3-dimethylglutaric acid; 2,2-dimethylglutaric acid; maleic acid, fumaric acid, itaconic acid; and the like. Anhydrides of the above acids, where they exist, can also be employed and are encompassed by the term "polycarboxylic acid". In addition, certain materials which react in a manner similar to acids to form polyester polyols are also useful. Such materials include lactones such as caprolactone, propylolactone and methyl caprolactone, and hydroxy acids such as hydroxy caproic acid and dimethylolpropionic acid. If a triol or higher hydric alcohol is used, a monocarboxylic acid, such as acetic acid and benzoic acid, may be used in the preparation of the polyester polyol, and for some purposes, such a polyester polyol may be desirable. Moreover, polyester polyols useful in the invention generally do not include polyester polyols modified with fatty acids or glyceride oils of fatty acids (i.e., conventional alkyd polyols containing such modification). A preferred way of making a polyester polyol suitable for the invention is to react an alkylene oxide such as ethylene oxide, propylene oxide, butylglycidyl ether, and the glycidyl esters of organic acids such as CARDURA-E, with the carboxylic acid to form the corresponding ester. By this method, there are essentially no vicinal hydroxyl groups in the resulting polyol product.

Examples of the optional monohydric alcohols which may be used to prepare the polyester polyols include: ethanol, propanol, isopropanol, n-pentanol; neopentyl alcohol; 2-ethoxyethanol; 2-methoxyethanol; 1-hexanol; cyclohexanol; 2-methyl-2-hexanol; 2-ethylhexyl alcohol; 1-octanol, 2-octanol, 1-nonanol; 5-butyl-5-nonanol, isodecyl alcohol, and the like. Usually, the hydrophobic properties of the resin can be enhanced by employing monalcohols containing more than 4 carbon atoms.

Hydrophobic polyether polyols which may be used in the preparation of resins of the invention are generally known. Examples of hydrophobic polyether polyols include the poly-(oxypropylene) glycols prepared by the acid or base catalyzed addition of propylene oxide to propylene glycol or dipropylene glycol initiators and by the copolymerization of propylene oxide and ethylene oxide with initiator compounds such as trimethylolpropane, glycerol, pentaerythritol, sorbitol, sucrose and the like. The hydrophobic polyether polyols also include the generally known poly-(oxytetramethylene) glycols prepared by the polymerization of tetrahydrofuran in the presence of Lewis acid catalysts such as boron trifluoride, tin (IV) chloride, antimony pentachloride, antimonytrichloride, phosphorous pentafluoride, and sulfonyl chloride. Other examples of hydrophobic polyether polyols include the generally known reaction products of 1,2-epoxide-containing compounds with polyols such as those included in the description of simple diols, triols, and higher hydric alcohols above.

Hydrophobic amide-containing polyols are generally known and typically are prepared from any of the above-described diacids or lactones and diols, triols and higher alcohols, and diamines or aminoalcohols as illustrated, for example, by the reaction of neopentyl glycol, adipic acid and hexamethylenediamine. The amide-containing polyols also may be prepared through aminolysis by the reaction, for example, of carboxylates, carboxylic acids, or lactones with aminoalcohols. Examples of suitable diamines and aminoalcohols include hexamethylenediamine, ethylenediamine, phenylenediamines, toluenediamines, monoethanolamine, diethanolamine, N-methyl-monoethanolamine, isophorone diamine, 1,8-methanediamine and the like.

Hydrophobic polyurethane polyols are generally known. Polyurethane polyols useful in the present invention can be produced by reacting any of the above-described polyols, including diols, triols, and higher alcohols, polyester polyols, polyether polyols, and amide-containing polyols with an organic polyisocyanate. The organic polyisocyanate may be reacted with the polyol either directly to form the polyurethane polyol or by the generally known prepolymer technique wherein the polyol and polyisocyanate are reacted in relative proportions to first produce an isocyanate terminated prepolymer with subsequent reaction of the prepolymer with additional polyol to form the polyurethane polyol. Also, mixtures of organic isocyanate prepolymers with monomeric isocyanates (so-called semi-prepolymers) may be employed in the prepolymer technique. In general, urethane formation improves the hydrophobicity of polyols.

The polyisocyanate which is reacted with the polyol essentially can be any organic polyisocyanate. The polyisocyanate may be aromatic, aliphatic, cycloaliphatic, or heterocyclic and may be unsubstituted or substituted with groups such as halogen, etc. Many such organic polyisocyanates are known, examples of which include: toluene-2,4-diisocyanate, toluene-2,6-diisocyanate, and mixtures thereof; diphenylmethane-4,4'-diisocyanate, diphenylmethane-2,4'-diisocyanate and mixtures thereof; p-phenylene diisocyanate; biphenyl diisocyanate; 3,3'-dimethyl-4,4'-diphenylene diisocyanate; tetramethylene-1,4-diisocyanate; hexamethylene-1,6-diisocyanate; 2,2,4-trimethylhexane-1,6-diisocyanate; lysine methyl ester diisocyanate; bis (isocyanatoethyl) fumarate; isophorone diisocyanate; ethylene diisocyanate; dodecane-1,12-diisocyanate; cyclobutane-1,3-diisocyanate; cyclohexane-1,3-diisocyanate, cyclohexane-1,4-diisocyanate and mixtures thereof; methylcyclohexyl diisocyanate; hexahydrotoluene-2,4-diisocyanate, hexahydrotoluene-2,6-diisocyanate and mixtures thereof; hexahydrophenylene-1,3-diisocyanate, hexahydrophenylene-1,4-diisocyanate and mixtures thereof; perhydrodiphenylmethane-2,4'-diisocyanate, perhydrodiphenylmethane-4,4'-diisocyanate and mixtures thereof. It is to be understood that mixtures of polyisocyanates and monoisocyanates may be utilized as the polyisocyanate for preparing the hydrophobic polyurethane polyols.

As stated previously, the hydrophobic polyol is reacted with the organosilicon-containing material comprising an organosilicon-containing substance (defined herein) optionally a nonfunctional organosilane (defined herein) and optionally a functional organosilane (defined herein) to produce a resin of the invention. The organosilicon-containing materials employed to produce the resins of the present invention typically are either incompatible with the hydrophobic polyol or are undesirably highly volatile. An organosilicon-containing material which is incompatible with a hydrophobic polyol, when mixed at room temperature with the polyol, separates into layers. Therefore, it is necessary to react the hydrophobic polyol and the organosilicon-containing material to produce a homogeneous product. Furthermore, the homogeneous product is much less volatile under conditions of curing than an unreacted mixture of the polyol and organosilicon-containing material.

The organosilicon-containing substance required in the organosilicon-containing material is defined as follows. An organosilicon-containing substance useful in the invention is organic and is essentially free of alkali metal ions which distinguish it from generally known inorganic silicates such as alkali metal silicates including, for example, sodium orthosilicate. All atoms bonded directly to Si in the organosilicon-containing substance are selected from oxygen, nitrogen and/or chlorine, preferably oxygen and/or nitrogen, most preferably all of such atoms being oxygen. Thus, silicon in the organosilicon-containing substance will be bonded to atoms other than O and/or N, such as C or another Si atom, through the O or N atoms. The organosilicon-containing substance additionally has moieties directly bonded to Si which are easily displaceable by reaction with water and/or alcohol. Examples of moieties directly bonded to Si which are easily displaceable by reaction with water or alcohol include

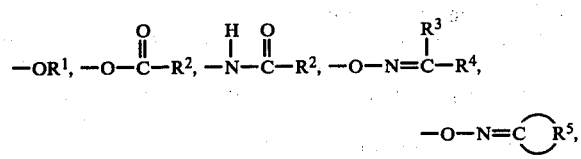

and the $C_2$ to $C_3$ residue of a 1,2- or 1,3-glycol, wherein
$R^1$ represents $C_1$-$C_3$ alkyl,
$R_2$ represents H or $C_1$-$C_4$ alkyl,
$R^3$ and $R^4$ independently represent H, $C_1$-$C_4$ alkyl, $C_6$-$C_8$ cycloalkyl, or $C_6$-$C_8$ aryl, and
$R^5$ represents $C_4$-$C_7$ alkylene.
Preferably all of the moieties directly bonded to Si which are easily displaceable by reaction with water and/or alcohol are lower alkoxy moieties selected from the group consisting of methoxy, ethoxy, and propoxy. It will be appreciated that the oxygen atom in, for example, an ethoxy moiety attached to Si of course serves as an atom bonded directly to Si selected from O, N, and/or Cl as discussed above. It is required that at least a part of the organosilicon-containing substance be hydrolyzed to a compound or a mixture of compounds. Generally, some of the hydrolysis products will be condensed to the corresponding siloxane materials containing one or more siloxane linkages

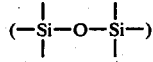

per molecule. The degree of hydrolysis of the hydrolyzed organosilicon-containing substance can conveniently be considered to be that degree of hydrolysis required to convert at least 10 percent, preferably at least 20 percent, and most preferably at least 30 percent by weight of the moieties directly bonded to Si which are easily displaceable, theoretically, to form silanol groups

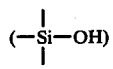

regardless of the actual degree of condensation of the silanol groups. For example, if tetraethylorthosilicate represented the silicon-containing substance, a degree of hydrolysis of 10 percent would mean that at least 10 percent by weight of the ethoxy moieties of the tetraethylorthosilicate could be thought to be theoretically converted to silanol groups regardless of the actual degree of condensation to siloxane containing compounds in the hydrolyzed product. Additionally, compounds or a mixture of compounds containing siloxane linkages in sufficient amounts to be considered to have been prepared theoretically from unhydrolyzed silicon-containing substances, as defined herein, to at least a 10 percent, preferably at least 20 percent, and most preferably at least 30 percent degree of hydrolysis as defined above, regardless of the actual manner of preparation, are understood to fall within the definition of an organosilicon-containing substance at least a part of which is hydrolyzed to a compound or a mixture of compounds. Of course, the hydrolyzed organosilicon-containing substance must also contain a residual amount of the aforementioned moieties directly bonded to Si which are easily displaceable by reaction with water and/or alcohol.

It is also to be understood that the organosilicon-containing substances useful for the invention having atoms bonded directly to Si selected from O, N and/or Cl are essentially free of functional groups directly attached to carbon atoms, examples of which groups include isocyanate, epoxy, amino, etc. As will be apparent, the previously described moieties bonded directly to Si which are easily displaceable by reaction with water or alcohol do not fall into the category of functional groups referred to in the immediately preceding sentence.

By way of illustration, an especially desirable class of organosilicon-containing substances suitable in the invention include organosilicates which prior to hydrolysis correspond to the following formula I,

wherein
$R^6$ represents methyl, ethyl or propyl,
$R^7$ represents alkyl containing at least 4 carbon atoms, aryl, alkylaryl, arylalkyl, aryloxyalkyl, or alkyloxyalkyl, and
x is an integer ranging from 0 to 3, preferably 0 or 1, and most preferably 0.
Examples of useful organosilicates include: tetramethoxysilane, tetraethoxysilane, tetra-n-propoxysilane, methoxytriethoxysilane, dimethoxydiethoxysilane, trimethoxy-n-propoxysilane, bis(2-ethylhexoxy)diethoxysilane, butoxytriethoxysilane, and the like. Mixtures of organosilicates also may be used as the organosilicon-containing substance.

Of the organosilicates corresponding to the formula I, above, the tetraalkoxysilanes wherein x equals 0 in formula I are preferred. The tetraalkoxysilanes provide a high degree of functionality to the resins of the invention and enhance the ease with which the resins of the invention can be cured. Additionally, the tetraalkoxysilanes are readily available at low cost. Furthermore, they can be used to attach modifying groups such as those represented by —$OR^7$ in formula I above, an example of which is a sec-butoxy group. Surprisingly, cured films produced from resins of the invention prepared from the organosilicates are resistant to degradation by water such as water vapor or liquid water.

Of the examples of organosilicates described above, tetramethoxysilane is desirable for some purposes because of the ease with which it reacts with the hydroxyl moiety of the hydrophobic polyol. Tetraethoxysilane is especially desirable since, although tetraethoxysilane is not as reactive as tetramethoxysilane, it does not provide the possibility of toxicity problems that may be encountered with the use of tetramethoxysilane and is not as highly volatile as tetramethoxysilane.

Examples of organosilicon-containing substances, other than the above organosilicates, which may be utilized in the invention include tetraacetoxysilane, diethoxydiacetoxysilane, and

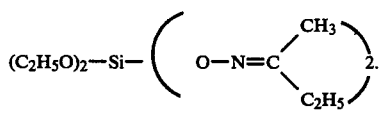 2.

As stated previously, at least a part of the organosilicon-containing substance is hydrolyzed for preparation of resins of the invention. Hydrolyzed organosilicon-containing substances provide increased reactive groups per molecule in the resins. Additionally, the hydrolyzed organosilicon-containing substances help provide low volatility to the resins of the invention.

Generally, some of the hydrolysis products will be condensed to the corresponding siloxane materials. These siloxane materials contain compounds containing one or more siloxane linkages represented by the formula, II,

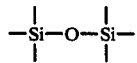 (II)

Usually these hydrolyzed and condensed organosilicon-containing substances are prepared in generally known manner by the hydrolysis of precursors which contain silicon atoms attached to substituents convertible to hydroxyl (i.e., silanol) groups. These hydrolysis reactions typically may be illustrated as,

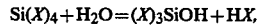

in which X can be an easily displaceable group such as

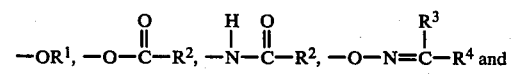

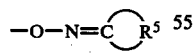

which groups are defined as above. The above silanol containing products often are condensed to produce one or more

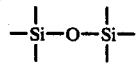

linkages in the hydrolyzed and condensed organosilicon-containing substances. Of course, it should be understood that organosilicon-containing substances which are hydrolyzed are intended to include those hydrolyzed materials prepared from precursors which contain silicon atoms attached to hydrolyzable substituents other than the hydrolyzable groups defined above (represented by X in the equation above) such hydrolyzable substituents including, for example, halogen such as chloro. Such hydrolyzed materials prepared from precursors which contain silicon atoms attached to hydrolyzable halo substituents are substantially the same as those hydrolyzed materials prepared from precursors which contain silicon atoms attached to hydrolyzable groups X defined above, inasmuch as both types of precursors when hydrolyzed form silanol groups which can be condensed to form siloxane linkages.

It is also considered to be within the scope of the present invention to use mixtures of the organosilicon-containing substances and hydrolyzed organosilicon-containing substances as the organosilicon-containing material for preparation of a resin of the invention.

Some specific examples of hydrolyzed and condensed organosilicon-containing substances useful for preparing resins of the invention include hexaethoxy disiloxane, octaethoxy trisiloxane, and SILBOND-40, a hydrolyzed and condensed tetraethoxysilane available from Stauffer Chemical Company.

Where desired, organosilicon-containing substances and/or hydrolyzed organosilicon-containing substances containing higher alkoxy, aryloxy, arylalkyloxy, alkylaryloxy, alkyloxyalkyloxy, and/or aryloxyalkyloxy moieties attached to one or more silicon atoms in addition to the required easily displaceable moieties may be employed, for preparation of the resins of the invention. The term "higher alkoxy" is intended to mean an alkoxy group having at least 4 carbon atoms such as sec-butoxy, n-pentoxy, isopentoxy, neopentoxy, hexoxy, nonoxy, isodecyloxy and the like. Examples of aryloxy, arylalkyloxy, alkylaryloxy, alkyloxyalkyloxy and/or aryloxyalkyloxy moieties include phenoxy, benzyloxy, phenylethoxy, tolyloxy, xylyloxy, 4-ethylphenoxy, phenoxyethoxy, 2-butoxyethoxy and the like. It is believed that the presence of such higher alkoxy, aryloxy, arylalkyloxy, alkylaryloxy, alkyloxyalkyloxy and/or aryloxyalkyloxy moieties from the organosilicon-containing material provides decreased volatility to the resins of the invention and enhanced hydrolytic stability to cured films prepared from the resins of the invention. However, as stated previously, the reaction product should contain a residual amount of the moieties from the organosilicon-containing material (i.e., component B) which are directly bonded to silicon and are easily displaceable and a residual amount of hydroxyl moieties from the hydrophobic polyol such that the reaction product can be gelled according to the gel test described infra and such that the reaction product is capable of self-curing to a continuous film by reaction of such residual easily displaceable moieties with moisture and/or the residual hydroxyl moieties from the hydrophobic polyol. When an organosilicate is the organosilicon-containing substance, the reaction product generally will contain from 20 to 0.5 milliequivalents per gram of the reaction product of lower alkoxy moieties, $—OR^6$, as defined in formula I above. Moreover, the organosilicon-containing material typically utilized for reaction with the hydrophobic polyol will have a total content of lower alkoxy moieties based on the organosilicon-containing substance, optional nonfunctional organosilane and optional functional organosilane ranging from 26 milliequivalents per gram to 5 milliequivalents per gram of organosilicon-containing material. It is of course to be understood that when a nonfunctional organosilane and/or a functional organosilane is included in the organosilicon-containing material in addition to the organosilicon-containing substance at least a part of which organosilicon-containing substance is hydrolyzed, that the nonfunctional and/or functional organosilane can be partially hydrolyzed either individually or in combination with the organosilicon-containing substance. Thus, when organosilicate is utilized as organosilicon-containing substance in combination with nonfunctional and/or functional organosilane, the range of 26–5 milliequivalents of lower alkoxy moieties per gram of organosilicon-containing material includes any lower alkoxy moieties from the functional and/or nonfunctional organosilane whatever the degree of hydrolysis and condensation of the components of the organosilicon-containing material. Typically, the higher ratio by weight of higher alkoxy, aryloxy, arylalkyloxy, alkylaryloxy, alkyloxyalkyloxy and/or aryloxyalkyloxy moieties to the easily displaceable moieties (such as lower alkoxy moieties) in the resin, the lower the cure response of the resin. By lower "cure response" is meant either a longer time at a given temperature, or a higher temperature for a given length of time, to cure the resin to a dry, tack free state.

Optionally, the organosilicon-containing material for the preparation of a resin of the invention optionally may comprise an organosilicon material selected from a nonfunctional organosilane, a partially hydrolyzed nonfunctional organosilane or a mixture thereof as well as cohydrolyzed products of the organosilicon material and the organosilicon-containing substance. These organosilicon materials can be utilized to help provide hydrophobicity to the silicon-containing material where desired. When the organosilicon-containing material does comprise such organosilicon material, the amount of such organosilicon material generally ranges from greater than 2 to less than 80 percent, preferably less than 50 percent, and most preferably less than 25 percent by weight of the organosilicon-containing material. As used herein, a nonfunctional organosilane is understood to mean a material corresponding to the formula, III,

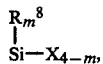

III wherein
$R^8$ represents hydrogen, alkyl, aryl, alkylaryl, arylalkyl, or aryloxyalkyl;
X represents

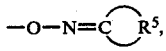

wherein
$R^1$ represents $C_1$–$C_3$ alkyl,
$R^2$ represents H or $C_1$–$C_4$ alkyl,
$R^3$ and $R^4$ independently represent H, $C_1$–$C_4$ alkyl, $C_6$–$C_8$ cycloalkyl, or $C_6$–$C_8$ aryl,
$R^5$ represents $C_4$–$C_7$ alkylene, and
m is an integer ranging from 1 to 3, preferably 2 or 3, and most preferably 1.

It should be understood that the term "nonfunctional organosilane" wherever appearing herein is used for convenience to distinguish compounds corresponding to the above formula, III (or the hydrolysis products thereof) from those compounds (or the hydrolysis products thereof) referred to herein for convenience as functional organosilanes and corresponding to the formula IV infra. Thus, although moieties defined by X in formula III are considered to be easily displaceable by reaction with water and/or alcohol and are therefore necessarily rather reactive, they are not defined herein as "functional" as this word is used in connection with the definition of a "functional organosilane" infra.

Typically, when a nonfunctional organosilane (or a hydrolysis product thereof) is utilized as part of the organosilicon-containing material (component B), a nonfunctional organosilane corresponding to formula III in which X corresponds to —$OR^1$ as defined above is employed.

Examples of nonfunctional organosilanes corresponding to the above formula, III, include trimethoxymethylsilane, dimethoxydimethylsilane, methoxytrimethylsilane, triethoxymethylsilane, diethoxydimethylsilane, ethoxytrimethylsilane, dimethoxydiphenylsilane, diethoxydiphenylsilane, diethoxymethylphenylsilane, ethoxydimethylphenylsilane, methoxydimethylphenylsilane, ethoxytripropylsilane, diethoxydipropylsilane, dimethoxydipropylsilane, and the like. Additional examples of the nonfunctional organosilanes include amyltriethoxysilane and triethoxysilane. Mixtures of nonfunctional organosilanes also may be used as the optional organosilicon material.

Such organosilicon materials contribute to water resistance, toughness, and stain resistance of cured films prepared from resins of the invention incorporating these organosilicon materials (and/or hydrolysis products thereof). Trialkoxysilanes corresponding to formula III above (i.e., m equals 1 and X represents —$OR^1$) are preferred, those in which $R^8$ represents hydrogen, methyl, ethyl or phenyl being most preferred. These trialkoxysilanes are especially preferred when such organosilicon materials are employed because of the balance they provide among hydrophobicity, ease of reaction with the hydrophobic polyol, availability, and the contribution of the —$OR^1$ groups to good curing. However, the dimethyldialkoxysilanes corresponding to formula III above are less desirable than the trialkoxysilanes since it is believed that the dimethyldialkoxysilanes tend to decrease adhesion to the substrate of cured films prepared from resins of the invention incorporating the dimethyldialkoxysilanes. The monoalkoxysilanes corresponding to formula III above (i.e., m equals 3 and X represents —$OR^1$) are the least desirable of this type of organosilicon material since they act as chain terminators in the reaction between the organosilicon-containing material and the hydrophobic polyol. Thus, when the monoalkoxysilanes are to be utilized in the preparation of resins of the invention, they should be used in controlled amounts.

As stated above, trialkoxysilanes corresponding to formula III such as methyltrimethoxysilane are especially preferred as the optional organosilicon material. Phenyltrialkoxysilane or trialkoxysilanes wherein —$R^8$ in formula III is represented by an aliphatic group containing more than about 14 carbon atoms are less desirable than methyltrimethoxysilane since they tend to decrease the ease of curing of resins of the invention. However, phenyltrialkoxysilanes often help the weatherability of films when properly cured.

When a mixture containing trialkoxysilanes and dialkoxysilanes is employed as the optional organosilicon material, the moles of trialkoxysilane to moles of dialkoxysilane can vary to give desirable properties. The average functionality based on lower alkoxy moieties of a mixture containing the organosilicon-containing substance and nonfunctional organosilanes for preparation of a resin of the invention excluding the contribution to lower alkoxy moieties by any monoalkoxysilane which may be present in the mixture generally is greater than 2.2, preferably is greater than 2.7, and most preferably is greater than 3.3. For example,

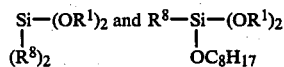

would represent difunctional compounds with respect to the lower alkoxy moieties $-OR^1$. The $-OC_8H_{17}$ group for example (which can be present in the nonfunctional organosilane as discussed in the following paragraph) would not contribute to the aforesaid average functionality.

Where desired, a nonfunctional organosilane, hydrolyzed nonfunctional organosilane, or mixture thereof, containing higher alkoxy, aryloxy, alkylaryloxy, arylalkyloxy, alkyloxyalkyloxy, and/or aryloxyalkyloxy moieties as defined previously may be used as the optional organosilicon material. The organosilicon materials containing such moieties are believed to contribute to decreased volatility of resins of the invention and also to water resistance of cured films which may be prepared from resins incorporating these organosilicon materials. Organosilicon materials containing such moieties may be prepared, for example, by reacting an organosilane, hydrolyzed organosilane, or a mixture thereof, with a suitable monohydric alcoholic or monohydric phenolic material so as to provide higher alkoxy, aryloxy, alkylaryloxy, arylalkyloxy, alkyloxyalkyloxy, and/or aryloxyalkyloxy moieties to the organosilane. Examples of such nonfunctional organosilanes include: pentoxydimethoxymethylsilane, isopentoxydiethoxymethylsilane, 2-ethylhexoxydiethoxymethylsilane, 2-butoxyethoxydiethoxymethylsilane, diisodecyloxyethoxymethylsilane, phenoxydiethoxyphenylsilane, ethoxyphenoxydipropylsilane, tolyloxydimethoxymethylsilane, phenylethyloxydimethoxymethylsilane, benzyloxydiethoxymethylsilane, and the like. Mixtures of nonfunctional organosilanes containing such higher alkoxy, aryloxy, alkylaryloxy, arylalkyloxy, alkyloxyalkyloxy, and/or aryloxyalkyloxy moieties also may be used as the optional organosilicon material.

Hydrolyzed nonfunctional organosilanes are organosilanes corresponding to the above formula, III, which have been hydrolyzed in known manner. Generally, some of the hydrolysis products are condensed to the corresponding siloxane materials which contain one or more siloxane linkages represented by formula, II, above. Usually these hydrolyzed nonfunctional organosilanes are prepared in generally known manner similar to the preparation of the hydrolyzed organosilicon-containing substances such as the hydrolyzed organosilicates described above. Hydrolysis reactions for the preparation of hydrolyzed nonfunctional organosilanes may be illustrated as,

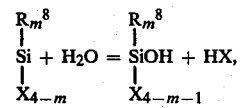

in which, $R^8$ represents hydrogen, alkyl, aryl, alkylaryl, arylalkyl, or aryloxyalkyl;

X represents a hydrolyzable group as defined in formula III above; and m is an integer ranging from 1 to 3.

The above silanol products are generally condensed to produce siloxane linkages in the hydrolyzed nonfunctional organosilanes. As for the hydrolyzed organosilicates described above, it should be understood that the phrase, "hydrolyzed nonfunctional organosilane" is intended to include those hydrolyzed materials prepared from precursors which contain silicon atoms attached to hydrolyzable substituents other than the hydrolyzable groups, above represented by X in formula III, such hydrolyzable substituents including, for example, halogen such as chloro.

It is also considered to be within the scope of the present invention to use mixtures of the optional nonfunctional organosilanes and hydrolyzed nonfunctional organosilanes optionally containing higher alkoxy, aryloxy, alkylaryloxy, arylalkyloxy, alkyloxyalkyloxy, and/or aryloxyalkyloxy moieties, as part of the organosilicon-containing material for preparation of resins of the invention.

Optionally, the organosilicon-containing material (component B) may comprise a functional organosilane. When the organosilicon-containing material does comprise such functional organosilane, the amount of such functional organosilane generally ranges from greater than 2 to less than 50 percent, preferably less than 30 percent, and most preferably less than 15 percent, by weight of the organosilicon-containing material. As used herein, a "functional organosilane" is intended to include materials corresponding to the following formula, IV, $$Y-G-SiX_3 \text{ (IV)},$$

wherein

G represents an organo group containing from 2 to 12 carbon atoms,

X represents

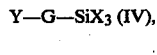

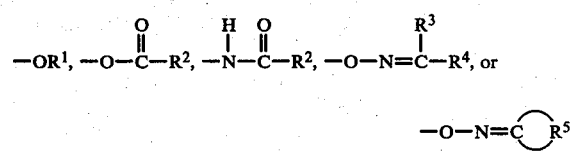

wherein $R^1$ represents $C_1$-$C_3$ alkyl, $R^2$ represents H or $C_1$-$C_4$ alkyl, $R^3$ and $R^4$ independently represent H, $C_1$-$C_4$ alkyl, $C_6$-$C_8$ cycloalkyl or $C_6$-$C_8$ aryl;

$R^5$ represents $C_4$-$C_7$ alkylene, and

Y represents an amino, epoxy, mercapto, isocyanato, ureido, a group corresponding to

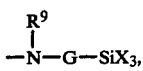

or a group corresponding to —SiX$_3$
wherein R$^9$ represents H or C$_1$–C$_4$ alkyl and G and X are as defined above.

In accordance with the discussion of the distinction between nonfunctional organosilanes and functional organosilanes as these terms are used herein, groups defined by Y above are considered to be the "functional" groups encompassed by the term "functional organosilane." Some examples of functional organosilanes include gamma-aminopropyltriethoxysilane, beta-aminoethyltriethoxysilane, gamma-mercaptopropyltriethoxysilane, gamma-isocyanatopropyltriethoxysilane, and ureidopropyltriethoxysilane. It will be appreciated by those skilled in the art that functional organosilanes containing mutually reactive functional groups such as 1,2-epoxy and amino, or amino and isocyanato, etc., or groups defined by Y above which are reactive with groups defined by X above, should be employed in controlled amounts to prepare resins of the present invention so as to avoid gelation or high viscosity products.

It is to be understood that mixtures or hydrolyzed mixtures of (1) the organosilicon-containing substance, hydrolyzed organosilicon-containing substance or mixtures thereof optionally containing higher alkoxy, aryloxy, alkylaryloxy, arylalkoxy, alkyloxyalkyloxy, and/or aryloxyalkyloxy moieties with, (2) the optional nonfunctional organosilanes, hydrolyzed nonfunctional organosilanes and mixtures thereof optionally containing higher alkoxy, aryloxy, alkylaryloxy, arylalkyloxy, alkyloxyalkyloxy, and/or aryloxyalkyloxy moieties, and (3) the optional functional organosilanes, hydrolyzed functional organosilanes and mixtures thereof may be employed as the organosilicon-containing material for preparation of the resins of the instant invention.

Although the incorporation of the nonfunctional and/or functional organosilanes (and/or the hydrolysis and cohydrolysis products thereof) in the organosilicon-containing material may be desirable for some purposes, these materials tend to be costly. Surprisingly, it has been found that cured resins of the invention having good properties may be prepared from the reaction products wherein the amount of such nonfunctional and/or functional organosilanes has been minimized or even eliminated in the silicon-containing starting material for preparation of the reaction product. For example, resins of the invention which cure to films having good properties such as gloss, hardness, and water resistance may be prepared from reaction products wherein the organosilicon-containing material comprises from 50 to 100 percent by weight, based on the total weight of the organosilicon-containing material, of the organosilicon-containing substance at least a portion of which is hydrolyzed.

In preparing a resin of the invention, a hydrophobic polyol is mixed at room temperature with an organosilicon-containing material (component B) at least a part of which is hydrolyzed and typically reacted under a blanket of a nonreactive gas such as nitrogen at a temperature ranging from about 50° C. to about 180° C. for 0.5 to 50 hours with or without removing by distillation the low boiling volatile reaction product such as the volatile alcohol. If distillate is removed, a fractionating column may be used as a precaution to prevent removal of the starting materials. Depending on the choice of reactants and optionally catalysts, the reaction may be conducted under milder or more severe conditions of time and temperature. For example, the reaction may be conducted at a temperature such as 80° C. for about 1 hour with removal of alcohol. Or where the starting materials are less reactive, the reaction may be conducted for example at 175° C. for 3 hours in the presence of a catalytic amount of stannous octoate with the removal of volatile alcohol. The reaction is conducted at least until the reaction product is homogeneous (i.e., does not separate into layers at room temperature) and is preferably optically clear. Therefore, gelable reaction products which are stable dispersions are considered to be within the scope of the invention. Since, typically, the reactants are quite fluid, it is usually not necessary, and usually preferable, not to include solvents in the reaction medium, particularly where the product resin is to be used as essentially the only film forming component in a coating composition or where the product resin is to be used in a high solids coating composition with other components including an added organic solvent. A high solids coating composition as defined herein typically contains at least 50 percent preferably at least 60 percent, and most preferably at least 70 percent, by weight resin solids based on the weight of that portion of the composition including the reaction product (i.e., resin) and organic solvent but excluding the weight of pigments, fillers and the like which may be present in the coating composition. However, where desired, solvents which are compatible with the reactants can be employed. Moreover, the product resin may be thinned with solvent. Examples of such solvents include conventional ketones such as methyl ethyl ketone, hydrocarbons such as xylene and toluene, the mono- and dialkylethers of diethylene glycol such as diethylene glycol dibutyl ether and diethylene glycol diethyl ether and low molecular weight alcohols such as ethanol. Water can be employed to hydrolyze an unhydrolyzed organosilicon-containing material prior to, during, or even after reaction of the organosilicon-containing material with the hydrophobic polyol.

Where water is employed in the reaction mixture, the amount of water must be controlled because water is a reactant in the reaction mixture. Moreover, it is desirable that such water not be present as a separate phase. Additionally, a moisture-free atmosphere usually is employed because uncontrolled hydrolysis of the organosilicon-containing substance during resin preparation is not desired and also to minimize the water content in the resin product. Of course, it is to be understood that residual amounts of water as contained, for example, in commercially available polyester polyols which can be used in the resin preparation, are tolerable even where it is desired to minimize hydrolysis of the organosilicon-containing substance and water content in the resin product and in fact is useful to hydrolyze at least a part of the organosilicon-containing substance, particularly where an unhydrolyzed organosilicon-containing substance is employed as starting material.

Depending on the particular choice of reactants, the reaction between the organosilicon-containing material and hydrophobic polyol may be sluggish, and where desired, a catalyst may be utilized to speed up the reaction. Examples of such catalysts include: acids such as paratoluenesulfonic acid; tin-containing compounds such as butylstannoic acid, dibutyl tin oxide and stannous octoate; titanates such as tetraisopropyltitanate and tetrabutyltitanate; and the like. When catalysts are utilized in the preparation of the resins of the invention, reaction temperatures lower than about 120° C. are feasible. However, temperatures ranging from 160° C. to 200° C. are typically employed when a minimal amount of catalyst (or no catalyst) is used during resin preparation so as to optimize package stability.

Resins of the invention advantageously can be prepared from organosilicon-containing materials and hydrophobic polyols which are initially incompatible with one another. Such incompatible starting materials separate into layers at room temperature within a relatively short period even after thorough initial mixing. Additionally, resins of the invention advantageously can be prepared from organosilicon-containing materials containing low molecular weight, highly volatile, but readily available organosilicon-containing substances, for example, including tetramethylorthosilicate and tetraethylorthosilicate, and optionally low molecular weight, highly volatile nonfunctional organosilanes, for example, including methyltrimethoxysilane and methyltriethoxysilane. Such low molecular weight organosilicon-containing materials may be hydrolyzed to less volatile compounds before, during, or after combination with the hydrophobic polyol and before, during, or after reaction of the organosilicon-containing material with the hydrophobic polyol.

The amounts by weight of the hydrophobic polyol and organosilicon-containing material for preparation of a resin of the invention may vary. Generally, the amounts by weight of hydrophobic polyol and organosilicon-containing material are selected so that when reaction is discontinued, the homogeneous reaction product contains sufficient residual hydroxyl moieties from the hydrophobic polyol and sufficient residual moieties, directly bonded to silicon which are easily displaceable by reaction with water and/or alcohol, from the organosilicon-containing material that the reaction product can be gelled according to the specific gel test described infra. Additionally, the reaction product is capable of self-curing (for example without any additional crosslinkers) to a continuous film by reaction of the residual moieties bonded directly to silicon which are easily displaceable, with moisture and/or the residual hydroxyl moieties from the hydrophobic polyol. Typically, the specific hydrophobic polyol and organosilicon-containing material are selected and amounts of these respective starting materials chosen so that when reaction is discontinued, the homogeneous reaction product typically has a content of the residual moieties from the organosilicon-containing material which are easily displaceable ranging from 20 milliequivalents to 0.5 milliequivalents, preferably from 15 to 3 milliequivalents, and most preferably from 10 to 4 milliequivalents, per gram of reaction product and a content of residual hydroxyl moieties from the hydrophobic polyol ranging from 0.5 milliequivalents to 20 milliequivalents, preferably from 3 to 15 milliequivalents, and most preferably from 4 to 10 milliequivalents, per gram of reaction product. As used herein, one milliequivalent of either the hydroxyl moiety or the easily displaceable moiety directly bonded to silicon is equal to one millimole. For example, when the moieties from the organosilicon-containing material which are directly bonded to silicon and are easily displaceable are lower alkoxy moieties selected from methoxy, ethoxy and/or propoxy, the reaction product generally will have a residual content of the lower alkoxy moieties ranging from 20 to 0.5 milliequivalents, preferably from 15 to 3 milliequivalents, and most preferably from 10 to 4 milliequivalents, per gram of reaction product and a content of residual hydroxyl moieties from the hydrophobic polyol ranging from 0.5 milliequivalents to 20 milliequivalents, preferably from 3 to 15 milliequivalents, and most preferably from 4 to 10 milliequivalents, per gram of reaction product.

Depending on the particular choice of hydrophobic polyol and organosilicon-containing material, the mole ratio of hydroxyl moieties to, for example, lower alkoxy moieties in the starting materials to produce homogeneous reaction products which are capable of gelling, according to the gel test described infra, will vary. However, a useful guide for choosing the appropriate mole ratio is to choose the polyol and organosilicon-containing starting materials so as to provide a ratio of equivalents of hydroxyl moieties to equivalents of the easily displaceable moieties, such as lower alkoxy moieties, ranging from about 1:3 to about 3:1. Preferably a ratio of equivalents of about 1:2 to about 2:1 is employed.

Several variations on the general procedure for reacting the hydrophobic polyol and organosilicon-containing material to produce a gelable homogeneous product, preferably of low volatility, will be described to illustrate some of the various procedures which may be employed for preparing the resins of the invention.

In a first procedure, employing initially an unhydrolyzed organosilicon-containing substance, the hydrophobic polyol and organosilicon-containing material are reacted together until the reaction mixture is homogeneous. Thereafter, a controlled amount of water is introduced into the reaction vessel to hydrolyze at least a part of the organosilicon-containing material present in the reaction product mixture thereby reducing the volatility of the homogeneous product resin.

In a second procedure, the hydrophobic polyol and partially hydrolyzed organosilicon-containing material are reacted together until the reaction product is homogeneous optionally followed by vacuum distillation and removal of at least part of any remaining, volatile organosilicon-containing material, to produce a homogeneous product resin having low volatility.

In a third procedure, the organosilicon-containing material is first reacted with a controlled amount of water preferably at about 35° C. in a homogeneous system so as to at least partially hydrolyze the organosilicon-containing material. Thereafter, with or without removing the volatile by-products, the resulting, less volatile, hydrolyzed product is reacted with the hydrophobic polyol to produce a homogeneous product resin of the invention having low volatility.

In a fourth procedure, the hydrophobic polyol, organosilicon-containing material, and a controlled amount of water are introduced into a reaction vessel and thereafter reacted together in a single step to produce a homogeneous product resin of the invention having low volatility.

As stated previously, for some purposes it may be desirable to incorporate moieties of the type, $-OR^7$, as defined in formula I in resins of the invention. These moieties may be provided by the organosilicon-containing material from, for example, the organosilicon-containing substance and/or a nonfunctional organosilane (including their hydrolysis products). Such moieties, —OR$^7$, can be provided, for example, from modification of the organosilicon-containing material with an appropriate monohydric alcohol, before reaction with the hydrophobic polyol, during reaction with the hydrophobic polyol, or possibly even after reaction with the hydrophobic polyol. Such moieties may be desirable, for example, to modify the solubility characteristics of the organosilicon-containing material before reaction with the polyol or to modify the solubility characteristics of the product resin of the invention. Additionally, incorporation of such moieties into a resin of the invention can be employed to additionally decrease the volatility of the resin, increase the hydrophobic character of the resin, alter the functionality of the resin with respect to the curing moieties, and to modify the characteristics of a cured film prepared from a resin of the invention.

For example, an organosilicate corresponding to formula I wherein x equals 0, a hydrolyzed organosilicate, or a mixture thereof may be reacted with a monohydric alcohol, examples of which include: isobutyl alcohol, tert-butylalcohol, 1-phenyl-1-ethanol, sec-butyl alcohol, 2-methyl-2-butanol, 1-pentanol, neopentyl alcohol, 2-butoxyethanol, 2-hexoxyethanol, cyclohexanol, 2-methyl-2-hexanol, 2-ethyl-2-hexanol, 1-octanol, 2-octanol, 1-nonanol, 5-butyl-5-nonanol, isodecyl alcohol, 2-phenylethanol, and benzyl alcohol. Prereaction or postreaction of the monohydric alcohol with the organosilicate is one means of providing higher alkoxy, aryloxy, arylalkyloxy, alkylaryloxy, alkyloxyalkyloxy and/or aryloxyalkyloxy moieties to the silicon atoms in the organosilicate material. Preferably, anhydrous monohydric alcohols are employed for this purpose. The organosilicate material which has been reacted with the monohydric alcohol is then mixed with the hydrophobic polyol and reacted essentially according to the procedures described above. As discussed previously, similar modification of, for example, a nonfunctional organosilane can be employed to introduce such moieties into a resin of the invention.

Another way of incorporating moieties, —OR$^7$ as defined in formula I in resins of the invention is to first react a hydrophobic polyol with an organosilicate, hydrolyzed organosilicate or mixture thereof according to the procedures set forth above followed by the reaction of the resulting product with a monohydric alcohol according to the procedure set forth in the paragraph immediately above employing appropriate procedures to ensure reaction of the monohydric alcohol without gelling the reaction mixture. For example, one could use a large excess of monohydric alcohol to minimize further reaction of the residual hydroxyl groups from the hydrophobic polyol and minimize the possibility of gelation. When the desired degree of incorporation of monohydric alcohol is achieved, the excess monohydric alcohol may be removed by vacuum distillation or utilized as solvent for the reaction product.

Generally, resins of the invention may have a wide range of viscosities. An advantage of the resins of the invention is that they usually have low viscosities relative to their molecular weights. The reactions for producing resins of the invention are carried out until the resulting product resins are homogeneous. Further reaction increases the viscosity which often is less desirable when the resin is to be utilized in a high solids coating composition. Thus, depending on the viscosity desired, the extent of reaction may be controlled so as to achieve the desired viscosity within the constraints of achieving a homogeneous reaction product preferably of low volatility. The viscosities of the resins of the invention as measured at 25° C. with a Brookfield viscometer generally range from about 50 centipoise for (neat) reaction products without any added solvent or diluent up to about 5,000 centipoise for reaction products to which up to 20 percent by weight, based on the weight of the reaction product of a suitable solvent or diluent has been added. The resins of the invention which are preferred for high solids coating applications typically have Brookfield viscosities at 25° C. in the absence of any added solvent or diluent (i.e. neat) ranging from about 50 to about 5,000 centipoise most preferably from about 500 to about 4,000 centipoise.

As stated previously, a resin of the invention comprises a reaction product of the hydrophobic polyol and the organosilicon-containing material which is homogeneous, has a relatively low volatility, and is capable of being gelled. As will be appreciated by those skilled in the art of polymer science in general, an equation commonly referred to as the Flory equation has been used as a guideline to determine if a reaction mixture should gel, for example, given the number of moles of each of the reactive components, the number of reactive groups on each reactive component (i.e., the functionality of each component) and the desired theoretical extent of reaction (for example, 100 percent) of one of the reactive components. However, it has been found that the Flory equation does not provide a useful guideline for predicting whether a reaction mixture containing polyol and organosilicon-containing material will gel or not, probably because of the tendency in siloxane chemistry for the formation, for example, of six and eight membered rings which cannot easily be taken into account in the Flory equation.

Therefore, the following simple three-step procedure is given for determining whether a product resin prepared from hydrophobic polyol and organosilicon-containing material will gel. If the product resin does not gel as determined by the following three-step procedure, it is considered not to be within the scope of the present invention.

(Step 1) A 10-gram sample of the homogeneous product resin is introduced into a 2-ounce glass jar (about 15 centimeters high by 7.5 centimeters in diameter). The jar is covered with a cap. Next, the jar and its contents are heated in an oven at 300° F. (149° C.) for 120 minutes. Thereafter, the jar is removed from the oven and titled while still at essentially the oven temperature. A gelled resin will not flow whereas an ungelled resin will flow like a liquid at oven temperature. If the resin is gelled at the end of step 1, the resin is considered to be a resin of the invention. If the resin has not gelled by the end of step 1, step 2 is performed on the ungelled resin on which step 1 has already been performed. Step 2 is the same as step 1 except that 0.5 gram of stannous octoate is introduced into the sample before the procedure of step 1 is repeated and a vent hole is punched in the cap and covered with a piece of masking tape. If the resin is gelled at the end of step 2, it is considered to be a resin of the invention. If the resin has not gelled by the end of step 2, step 3 is performed on the ungelled resin on which step 2 has already been performed. Step 3 is the same as step 2 except that no additional catalyst is added and the temperature is 400° F. (204° C.). If the resin is gelled at the end of step 3, it is to be considered a resin of the invention.

The following procedure is offered as one procedure for determining the amount of lower alkoxy moieties in a product resin of the invention containing lower alkoxy moieties. The product is analyzed for free alcohol content. Ten grams of the reaction product is mixed with 50 grams of a monohydric alcohol having a high boiling point such as n-octyl alcohol and 3 grams of stannous octoate. The resulting mixture is heated at 170° C. in an oil bath and the low boiling alcohols are removed by distillation. This operation may last up to three hours. The resulting distillate is analyzed by gas chromatography to determine the selective proportions of the lower boiling alcohols. From the weight of the distillate, its composition, and the free alcohol content of the sample, one can readily determine the moles of lower alkoxy moieties per gram of reaction product. The moles of lower alkoxy moieties per gram of reaction product can be converted to a percent by weight of lower alkoxy moieties based on the weight of reaction product or alternatively to milliequivalents of lower alkoxy moieties per gram of reaction product.

The following procedure is used herein to determine the percent by weight of solids in a product resin of the invention. An 0.5 gram sample of resin is weighed onto an aluminum tray. The tray containing the sample is placed in a desiccator at 150° F. (65.6° C.) under a vacuum of 1 torr for 16 hours. The tray containing the sample is allowed to cool to room temperature under the vacuum and then reweighed. The percent by weight solids is calculated as the weight of the sample after the 16 hour heating procedure described above divided by the weight of the sample before the heating procedure times 100. For a less accurate determination of the percent by weight solids content of a resin than that described immediately above, a larger sample (for example, 5 grams) is distilled at 150° F. (65.6° C.) under a vacuum of 1 torr for 3 hours. The percent by weight solids content is calculated as the weight of the residue after heating divided by the weight of the sample before heating times 100.

Using the procedure for determining the percent by weight solids described above, the volatility of a resin of the invention also can be determined. Resins of the invention characterized as having "low volatility" exhibit a minimum of 50 percent of weight retention of organosilicon-containing material based on the weight of organosilicon-containing material in the product resin before and after the above percent by weight solids determination. Preferred resins show a 60 percent by weight retention, and most preferred resins show a 70 percent by weight retention.

The hydroxyl value, and therefore the hydroxyl equivalent weight, of a resin of the invention can be determined by generally known procedures.

Most of the resins of the invention are storage stable for periods of at least one year in airtight containers so as to prevent the introduction of moisture into the resins. Where desired, they may be stored under dry nitrogen. Also, resin compatible materials which easily hydrolyze so as to act as scavengers for water may be combined with the resin. Examples of such easily hydrolyzable resin compatible materials include organosilicates, organosilanes, or materials such as ethylorthoformate and 2,2-dimethoxy propane. Water-scavenging amounts of organosilicates or organosilanes can be incorporated with the resin either by combining them with the resin after the resin is prepared or by employing an excess of the organosilicon-containing material during the reaction of this material with the hydrophobic polyol. To those that are not as stable as desired such as some prepared using a catalyst, the resins surprisingly can be stabilized by using trace amounts of compounds which act as inhibitors such as boron trifluoride etherate (a 1 to 1 mole ratio of boron trifluoride in diethyl ether).

The resins of the invention advantageously may be utilized, with or without the presence of a catalyst, as essentially a sole film former for coating various substrates such as metal, paper, wood, hardboard, plastics and the like. They may be pigmented or unpigmented and may be utilized in the presence of various generally known additives such as flow control agents, surfactants, leveling agents, anti-mar agents, fungicides, mildewcides, and the like. Examples of pigments include any of the generally known pigments including extender pigments used in the coatings and resins industry such as titanium dioxide, magnesium carbonate, dolomite, talc, zinc oxide, magnesium oxide, iron oxides red and black, barium yellow, carbon black, strontium chromate, lead chromate, molybdate red, chromoxide green, cobalt blue, organic pigments of the azo series, etc. Mixtures of pigments also may be employed.

Coating compositions utilizing the resins of the invention may be applied to substrates using any suitable technique such as brushing, spraying, roll coating, doctor blade coating, etc.

Coating compositions utilizing the resins of the invention typically may be cured within about 30 minutes at a temperature of about 250° F. (121° C.). Examples of catalysts which may be utilized to promote curing of the resins include tetraisopropyl titanate, gamma-aminopropyltriethoxysilane, trifluoromethane sulfonic acid, dibutyl tin dilaurate, stannous octoate, and aluminum tris(sec-butoxide). When a catalyst is utilized to promote curing of the resin of the invention, the catalyst typically may be present in an amount ranging from about 0.1 to about 5 percent by weight based on the weight of the resin.

The following examples illustrate the invention and are not to be construed as limiting it to their details. As used herein, "pbw" means "parts by weight." All parts and percentages in the examples and throughout the specification are by weight unless specifically indicated otherwise.

EXAMPLES 1–6

(a) Reaction vessels 1 through 6 are charged with the materials in the amounts set forth in the following TABLE 1. The reaction vessels and contents are heated over a period of 30 minutes to a temperature of 85° C. to produce homogeneous resins of the invention 1 through 6.

TABLE 1

| Reaction Vessel | 1 | 2 | 3 | 4 | 5 | 6 |
|---|---|---|---|---|---|---|
| DOW-565* (grams) | 15 | 20 | 25 | 30 | 35 | 40 |
| SILBOND-40** (grams) | 35 | 30 | 25 | 20 | 15 | 10 |

*Primarily 2,2-bis (2-hydroxypropoxyphenyl) propane available from DOW Chemical Corporation.
**A hydrolyzed and condensed tetraethoxysilane having an ethoxy content of about 65 percent by weight (corresponding to about 15.6 milliequivalents of ethoxy groups) and a silicon content of 8 percent by weight available from Stauffer Chemical Company.

(b) Each of the vessels 1 through 6 containing resins 1 through 6, respectively, is placed for 1 hour in an oven at 300° F. (149° C.). After this period the resins are observed to see if they have gelled. The results are set forth in the following TABLE 2.

TABLE 2

| Resin | 1 | 2 | 3 | 4 | 5 | 6 |
|---|---|---|---|---|---|---|
| Gelled | yes | yes | yes | yes | yes | yes |

EXAMPLES 7-14

(a) Reaction vessels 7-14 are charged with the materials in the amounts set forth in the following TABLE 3. The reaction vessels and contents are heated over a period of 30 minutes to a temperature of 80° C. to produce homogeneous resins of the invention 7 through 14. Examples 7 and 8 required only ten minutes at 55° C. to become clear.

TABLE 3

| Reaction Vessel | 7 | 8 | 9 | 10 | 11 | 12 | 13 | 14 |
|---|---|---|---|---|---|---|---|---|
| DOW-565 (grams) | 35 | 25 | 25 | — | — | — | — | — |
| Ester Diol-204[1] (grams) | — | — | — | 25 | 15 | — | — | — |
| 1,4-Butanediol (grams) | — | — | — | — | — | 25 | 15 | 5 |
| SILBOND-40 (grams) | 7.5 | 12.5 | — | 25 | 35 | 25 | 35 | 45 |
| A-163/TEOS/H$_2$O[2] (grams) | 7.5 | 12.5 | 12.5 | — | — | — | — | — |
| TEOS/2.2 sec-BuOH[3] (grams) | — | — | 12.5 | — | — | — | — | — |
| Stannous octoate (drops) | — | — | — | 10 | 10 | 5 | 5 | 5 |

[1]2,2-dimethyl-3-hydroxypropyl-2,2-dimethyl-3-hydroxypropionate. (from Union Carbide Corporation)
[2]A hydrolyzed mixture obtained by the reaction of 8.81 moles (1200 g) of methyltrimethoxysilane (A-163 from Union Carbide Corp.), 1.47 moles (300 g) of tetraethylorthosilicate (TEOS) and 4.46 moles (80.3 g) of water using 0.003% by weight of 12 N HCL as catalyst. 355 grams of distillate is removed during the reaction.
[3]The product of the condensation of 13.2 moles (979.4 g) of sec-butyl alcohol with 5.94 moles (1235.5 g) of tetraethylorthosilicate using 0.05% of tetraisopropyltitanate and 0.088% by weight 12 N HCL as catalysts. 712.5 grams of distillate is removed during the reaction.

(b) Each of the vessels 7 through 14 containing resins 7 through 14, respectively, is covered with a cap and placed for 2 hours in an oven at 300° F. (149° C.). After this period the resins are observed to see if they have gelled. The results are set forth in the following TABLE 4.

TABLE 4

| Resin | 7 | 8 | 9 | 10 | 11 | 12 | 13 | 14 |
|---|---|---|---|---|---|---|---|---|
| Gelled | Yes | Yes | No | Yes | Yes | Yes | Yes | Yes |

Subsequently, 5 percent by weight of stannous octoate is introduced into the resin in vessel 9, and a hole is punched in the cap and covered with a piece of masking tape. Next, vessel 9 is put back into the oven for an additional 2 hours at 300° F. (149° C.) after which period the resin in vessel 9 is observed to have gelled.

(c) Samples of each of the resins from vessels 7 through 11 (prior to conducting the gel test described in part (b), immediately above) is drawn down on a steel panel to a wet film thickness of about 3 mils and cured for 30 minutes at 250° F. (121° C.). Resins 7 through 11 cured to hard, glossy films.

EXAMPLE 15

(a) A reaction vessel is charged with a reaction mixture of 1914 grams (g) of DOW-565 and 1276 grams of SILBOND-40. The reaction mixture is heated over a period of 2 hours and 20 minutes, the temperature ranging from 40° C. to 80° C. to produce a clear homogeneous reaction product, having a Gardner-Holdt bubble tube viscosity at 25° C. of 17 seconds. Next, heating is discontinued and the reaction mixture is cooled for 18 minutes to a temperature of 60° C. at which temperature 3.5 grams of a 9 percent by weight solution of boron trifluoride etherate in butyl alcohol is added to the reaction vessel. The reaction mixture is further cooled over an additional 34 minutes to 50° C. at which temperature an additional 2.2 grams of the boron trifluoride etherate is added to the reaction mixture. The product resin has a Gardner-Holdt bubble tube viscosity at room temperature of 44 seconds corresponding to a viscosity of about 3000 centipoise, and a measured percent by weight solids content of 78.7 percent by weight determined by heating a sample of resin for 2 hours at 150° C.

(b) A sample of the resulting product resin is placed in an oven at 80° C. for 2 hours after which the Gardner-Holdt viscosity is again measured and determined to be 49 seconds at 25° C.

The bubble tube viscosity of a sample of product resin after being allowed to remain at room temperature for 2 weeks is still 44 seconds which indicates the excellent stability of the product resin containing the boron trifluoride etherate.

(c) A coating composition is prepared by adding stannous octoate to the product resin of part (b) immediately above in an amount of 2 percent by weight based on the weight of the product resin. The coating composition is applied to a metal chromate/metal phosphate pretreated aluminum panel (ALODINE 407-47 from Amchem Products, Inc.) and cured for 10 minutes at 400° F. (204° C.) to a colorless coating having a dry film thickness of about 0.8 to 1.1 mil.

It is determined by X-ray fluorescence that the cured film contains about 25 percent elemental silicon. The cured coating has a high gloss, a pencil hardness of 3H, and good abrasion resistance. The cured coating is subjected to the following tests with the results as indicated.

The cured coating on a panel is immersed in boiling water for 24 hours with no apparent deleterious effect on the coating.

Cured coatings are subjected to a few drops of each of 5 normal hydrochloric acid, glacial acetic acid, 20 percent by weight aqueous sodium hydroxide, and diethylethanol amine which are allowed to remain on the coating covered by a watch glass. The coatings show no visible evidence of deterioration.

A cured coating is heated for 24 hours at 400° F. (204° C.) followed by 12 hours at 450° F. (232° F.). The coating remains glossy, shows no evidence of loss of adhesion to the panel, and shows only moderate yellowing.

What is claimed is:

1. A liquid composition comprising a reaction product prepared by partially reacting to homogeneity:
   (A) at least one hydrophobic polyol essentially free of modification by fatty acid; and
   (B) an organosilicon-containing material comprising
       (1) at least one organosilicon-containing substance free of functional groups attached directly to carbon and essentially free of alkali metal ions, having atoms bonded directly to Si, all of said atoms being selected from the group consisting of O, N and/or Cl, said organosilicon-containing substance additionally having moieties directly bonded to Si which are easily displaceable by reaction with water and/or alcohol, wherein at least a part of said organosilicon-containing substance is hydrolyzed to a compound or mixture of compounds, said compound or mixture of compounds containing a residual amount of the moieties directly bonded to Si which are easily displaceable by reaction with water and/or alcohol;

(2) optionally a nonfunctional organosilane, a hydrolyzed nonfunctional organosilane, or a mixture thereof; and (3) optionally a functional organosilane, a hydrolyzed functional organosilane, or a mixture thereof;

wherein said reaction product is homogeneous and contains (i) residual moieties from the organosilicon-containing material which are directly bonded to Si and are easily displaceable by reaction with water and/or alcohol and (ii) residual hydroxyl moieties from the hydrophobic polyol; and said reaction product is capable of self curing to a continuous film by reaction of (i) said residual moieties from the organosilicon-containing material which are directly bonded to Si and are easily displaceable, with moisture and/or with (ii) said residual hydroxyl moieties from the hydrophobic polyol.

2. The liquid composition of claim 1 wherein said moieties directly bonded to Si which are easily displaceable by reaction with water and/or alcohol are selected from the group consisting of

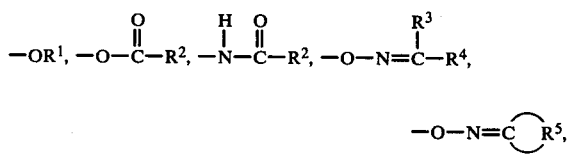

and the $C_2$ to $C_3$ residue of a 1,2- or 1,3-glycol, wherein $R^1$ represents $C_1$–$C_3$ alkyl, $R^2$ represents H or $C_1$–$C_4$ alkyl, $R^3$ and $R^4$ independently represent H, $C_1$–$C_4$ alkyl, $C_6$–$C_8$ cycloalkyl or $C_6$–$C_8$ aryl, and $R^5$ represents $C_4$–$C_7$ alkylene.

3. The liquid composition of claim 1 wherein all atoms directly bonded to Si of said organosilicon-containing substance are oxygen atoms.

4. The liquid composition of claim 1 wherein said moieties directly bonded to Si which are easily displaceable by reaction with water and/or alcohol are lower alkoxy moieties selected from the group consisting of methoxy, ethoxy and propoxy.

5. The liquid composition of claim 1 wherein said hydrophobic polyol is essentially free of phenolic hydroxyl moieties.

6. The liquid composition of claim 1 wherein said hydrophobic polyol is essentially free of 1,2-epoxy moieties.

7. The liquid composition of claim 1 wherein at least a part of said hydrophobic polyol contains novicinal hydroxyl groups.

8. The liquid composition of claim 4 wherein said lower alkoxy moieties are ethoxy moieties.

9. The liquid composition of claim 1 wherein said hydrophobic polyol has a hydroxyl equivalent weight of from 45 to 1000.

10. The liquid composition of claim 1 wherein said organosilicon-containing material comprises from 50 to 100 percent by weight, based on the total weight of said organosilicon-containing material, of said organosilicon-containing substance at least a portion of which is hydrolyzed.

11. The liquid composition of claim 1 wherein said hydrophobic polyol comprises a diol.

12. The liquid composition of claim 1 wherein said hydrophobic polyol has a hydroxyl equivalent weight of from 59 to 600.

13. The liquid composition of claim 1 wherein said hydrophobic polyol is selected from the group consisting of simple diols, triols, and higher hydric alcohols; polyester polyols; polyether polyols; amide containing polyols; and polyurethane polyols.

14. The liquid composition of claim 1 wherein said organosilicon-containing material comprises from greater than 2 to less than 80 percent by weight based on the total weight of said organosilicon-containing material of a nonfunctional organosilane, a hydrolyzed nonfunctional organosilane, or a mixture thereof, and optionally from greater than 2 to less than 50 percent by weight based on the total weight of said organosilicon-containing material of a functional organosilane, a hydrolyzed functional organosilane, or a mixture thereof.

15. The liquid composition of claim 14 wherein said organosilicon-containing material comprises a hydrolyzed mixture of at least a part of said organosilicon-containing substance; at least a part of said nonfunctional organosilane, hydrolyzed nonfunctional organosilane, or mixture thereof; and optionally, at least a part of said functional organosilane, hydrolyzed functional organosilane, or mixture thereof.

16. The liquid composition of claim 4 wherein said reaction product has a content of lower alkoxy moieties ranging from 20 milliequivalents per gram to 0.5 milliequivalents per gram of reaction product.

17. The liquid composition of claim 16 wherein said reaction product has a content of hydroxyl moieties ranging from 0.5 milliequivalents per gram to 20 milliequivalents per gram of reaction product.

18. The liquid composition of claim 1 additionally comprising an organic solvent, said composition having a percent by weight solids content of at least 50 percent by weight based on the total weight of resin solids present in said composition.

19. The liquid composition of claim 1 which gels when subjected to a three-step gel test consisting of (1) heating a 10 gram sample of said reaction product in a glass jar covered with a cap at 149° C. for 120 minutes, followed by (2) heating said sample at 149° C. for 120 minutes in the presence of 0.5 grams of stannous octoate in said glass jar with a vent hole covered by a piece of masking tape in said cap, followed by (3) repeating step 2 except that no additional stannous octoate is introduced into said sample and said heating is conducted at a temperature of 204° C.

* * * * *